E. GUNDLACH.
OBJECTIVES FOR ASTRONOMICAL TELESCOPES, &c.
No. 193,816.     Patented Aug. 7, 1877.
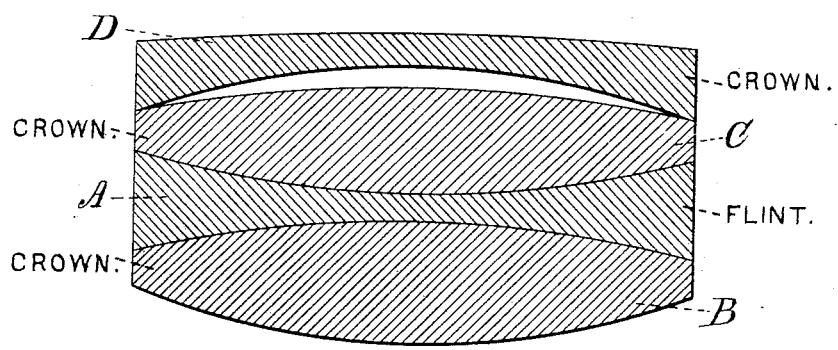
WITNESSES:
INVENTOR.

UNITED STATES PATENT OFFICE.

ERNST GUNDLACH, OF ROCHESTER, ASSIGNOR OF ONE-HALF HIS RIGHT TO J. J. BAUSCH, OF SAME PLACE, AND HENRY LOMB, OF BROOKLYN, NEW YORK.

IMPROVEMENT IN OBJECTIVES FOR ASTRONOMICAL TELESCOPES, &c.

Specification forming part of Letters Patent No. 193,816, dated August 7, 1877; application filed May 21, 1877.

*To all whom it may concern:*

Be it known that I, ERNST GUNDLACH, of Rochester, in the county of Monroe and State of New York, have invented a new and useful Improvement in Objectives for Astronomical Telescopes, and for other optical purposes; and I hereby declare that the following is a full and exact description and specification thereof.

The object of my invention is to construct an objective for astronomical telescopes, and for other optical purposes, in which the aberrations, spherical as well as chromatic, are corrected to a higher degree than has been the case in any objective hitherto constructed.

The common double objective hitherto used, and consisting of a negative flint-glass lens and positive crown-glass lens, is deficient by reason of chromatic over-correction at the outer edge, and chromatic under-correction toward the center. This is caused by the flint-glass lens, as usually shaped in these objectives, not having the proper form to remove this defect. Nor can it be perfectly removed by any alteration in the shape of the same, except at the expense of increased spherical aberration, the correction of both aberrations depending on the same factor, (the flint-glass lens,) and on opposite conditions of this factor, the best form for the complete correction of the one producing the maximum of the other aberration.

To obviate this difficulty I have constructed an objective in which both the chromatic and the spherical aberration are corrected by special means independent of each other, leaving the flint-glass lens to perform exclusively its legitimate and original function of correcting the chromatic aberration without reference to the spherical aberration, and correcting the latter by one or more negative crown-glass lenses of the proper focal relations to the other lenses composing the objective.

For the better understanding of this specification, I have reference to the accompanying drawing, representing a cross-section of an objective constructed in accordance with my invention, A representing the flint-glass lens, B and C crown-glass lenses, and D an additional negative crown-glass lens, the purpose of this latter being the completest correction possible of the spherical aberration.

As will be readily seen from the figure, I construct my objective with a flint-glass lens, A, which is concave on both sides, instead of the convex-concave flint-glass lens ordinarily used in double objectives. This double concave form is well known, and admitted to be the best form for the highest possible correction of the chromatic aberration, the concavo-convex form used in the double objective having been adopted only as a compromise, aiming at the correction of both aberrations at the same time, which, for the reasons I have above stated, can be only imperfectly attained under such circumstances.

This doubly concave flint-glass lens A, I place between two positive crown-glass lenses, B and C, of appropriate focal proportions. By this means the objective can be made almost absolutely achromatic, leaving the spherical aberration to be corrected by other and independent means.

The correction of the spherical aberration I effect by means of a special negative crown-glass lens, D, (or, if preferred, more than one negative crown-glass lens may be employed,) concavo-convex in shape, the concave surface of which has a shorter radius than the convex surface of the positive crown-glass lens next to it, so that between the two a space remains in the shape of a meniscus.

In this way the correction of one aberration is made independent of the other, and the correction of both may be effected to a higher degree of perfection.

The loss of illuminating power on account of the increased number of surfaces can hardly be considered a valid objection against this form of an objective, as said loss can be reduced to a minimum by cementing, by means of a proper medium, the adjoining surfaces, said loss being further reduced, in comparison with the double objective, by having in the above-described objective the outer surfaces consisting of crown-glass, the loss of light on such surfaces being less than on flint-glass surfaces. It will, moreover, be preponderatingly compensated by the better correction of the aberrations, and the greater clearness and sharpness of definition resulting therefrom.

Having thus described the nature of my invention, what I claim as new, and desire to have secured to me by Letters Patent, is—

An objective for telescopes and other optical instruments, wherein the spherical aberration is corrected independent of the chromatic aberration, by means of one or more separate negative (concavo-convex) lenses, the whole constructed in the manner and for the purposes substantially as described.

In testimony whereof I have signed my name to this specification in the presence of two subscribing witnesses.

ERNST GUNDLACH.

Witnesses:
J. J. BAUSCH,
HENRY LOMB.